INVENTORS.
MICHAEL SELA
RUTH ARNON
MIRIAM LAHAV

United States Patent Office 3,466,368
Patented Sept. 9, 1969

3,466,368
CLEAVAGE OF HUMAN GAMMA GLOBULIN BY MEANS OF CYANOGEN BROMIDE
Michael Sela and Ruth Arnon, Rehovoth, and Miriam Lahav, Tel-Aviv, Israel, assignors to the United States of America as represented by the Secretary, Department of Health, Education, and Welfare
Filed June 2, 1967, Ser. No. 643,165
Int. Cl. A61k 23/00, 27/00; C07g 7/00
U.S. Cl. 424—177                        9 Claims

ABSTRACT OF THE DISCLOSURE

A method of cleaving human immunoglobulin by reacting it with CNBr. The cleavage product, denoted $F(ab'')_2$, retains the beneficial properties of the native material, but is free of the well-known disadvantages which preclude the latter from intravenous use.

---

Figure 2:
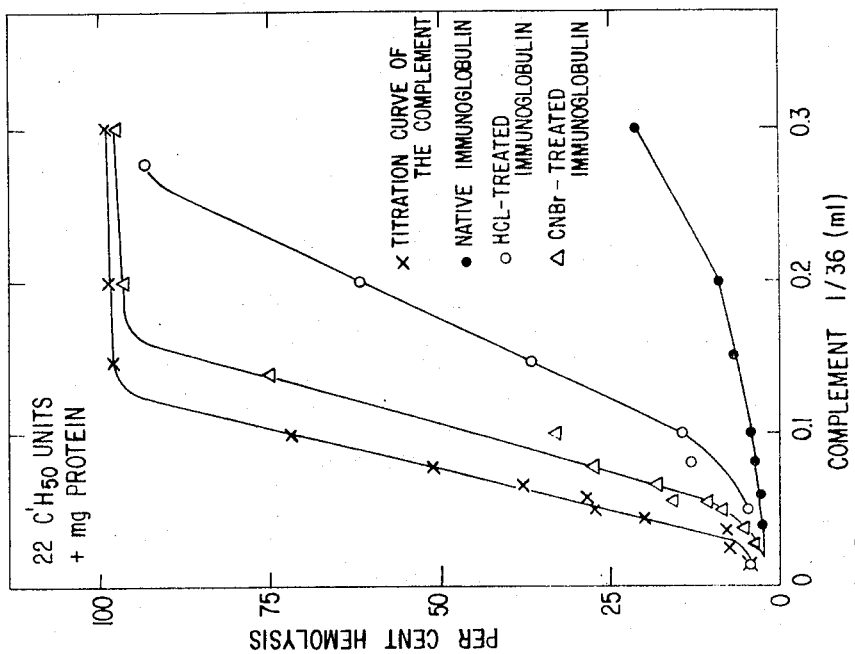

This invention relates to the cleavage of human immunoglobulin and to the cleavage product. More specifically this invention relates to a chemical method of cleaving human immunoglobulin and obtaining a cleavage product which retains most of the beneficial properties of native human immunoglobulin while being devoid of the disadvantages associated therewith.

In the following specification and claims the term "immunoglobulin" will be used for the substance also referred to in the professional literature as gamma globulin, γ-globulin, IgG, γG, or immunoglobulin G.

Human immunoglobulin has been in use for a period of about 20 years in medicine for the prophylaxis of certain viral diseases such as poliomyelitis, measles, infectious hepatitis and rubella, for the prophylaxis and therapy of tetanus and for the treatment of antibody deficiency syndromes to prevent recurrent bacterial infections. It is today common practice to administer human immunoglobulin to patients by way of intramuscular injection and apart from slight discomfort at the site of injection in the occasional patient the side effects in this form of administration are rare. Conversely, the human immunoglobulin solutions usually available are not suitable for intravenous injection because of the risks involved. Most of these are due to the skin-fixing and complement binding capacity of the native immunoglobulin as well as to genetic differences between globulins of different individuals which may lead to serious anaphylactoid reactions.

There are however various reasons for which the intravenous administration is to be preferred. Thus, upon intravenous administration the immunoglobulin acts more rapidly and there is no loss due to local proteolysis. This is of decisive importance owing to the inherently limited supply of human immunoglobulin. Also, intravenous administration does not cause painful local irritation when large quantities are given.

In view of the above, attempts have been made to cleave the human immunoglobulin in such a way as to obtain a degraded product which on the one hand still possesses substantially the same antibody activity as the native immunoglobulin while on the other hand being devoid of the complement-binding and skin-fixing capacities and genetic specificities thereof. All attempts for a degradation of the native human immunoglobulin have been on an enzymatic basis and cleavages with papain in the presence of cysteine and with pepsin have been reported. It has however been found that the product obtained from an enzymatic cleavage is not satisfactory for medical application for several reasons. Firstly, enzymatic cleavage lacks a satisfactory degree of specificity so that the cleavage product may not fully lack the disadvantages of the native material. Secondly, it is difficult to separate the enzyme from the reaction product which may then be impure.

Figure 1:
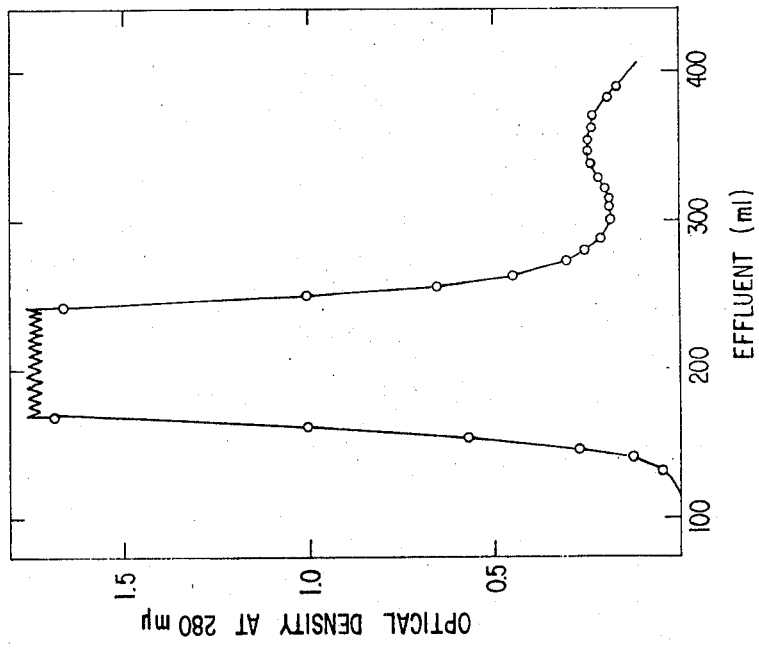

It is therefore an object of the present invention to provide a new cleavage product of native human immunoglobulin of well-defined physical and biological properties. It is a further object of the present invention to provide a chemical method for the cleavage of human immunoglobulin to produce a cleavage product suitable for use in medicine. It is yet another object of the present invention to provide compositions suitable for intravenous injections for prophylactic and therapeutic medical use, containing as an active ingredient a cleavage product of native immunoglobulin and having substantially the same antibody activity as the latter without any of the disadvantages thereof. Typically these would be saline solutions. These and other objects will become apparent from the following description and the drawings, wherein:

FIGURE 1 is the gel filtration pattern of the cyanogen bromide digest of human immunoglobulin on a Sephadex G–100 column, and FIGURE 2 is a chart comparing the complement-binding capacity of native immunoglobulin, the cleavage product of this invention, and a control.

The fragments resulting from the enzymic digestion of human immunoglobulin have been extensively studied with respect to immunological properties. Papain cleaves immunoglobulin in the presence of cysteine into three fragments, two Fab and one Fc.[1] The Fab fragments, though monovalent, retain full combining specificity for antigen, whereas the Fc fragment contains most of the antigenic determinants of immunoglobulin. Pepsin cleaves immunoglobulin to yield a divalent active fragment $F(ab')_2$, and smaller fragments derived from the Fc portion of the molecule. Reduction of immunoglobulin under mild conditions yields two types of chains, heavy and light, which can be separated by gel filtration. Some of the biological properties of native immunoglobulins, such as complement binding capacity, skin fixing ability and antigenic specificities have been shown to be localized in individual subunits and chains.

It is known that rabbit immunoglobulin G can be cleaved with cyanogen bromide in 0.3 M HCl and 0.00875 M phosphate buffer.[2] Molecular weight and amino acid composition determinations of the fragment obtained in this way show that its molecule is somewhat ---
[1] Nomenclature for human immunoglobulins, Bull. World Health Organ., 30 (1964), p. 447.
[2] Cahnmann et al., J. Biol. Chem., 241, No. 14 (1966), pp. 3247–3255.

smaller than that obtained by pepsin digestion of the same native material. With respect to the biological properties of the resulting cleavage product it could be established that its complement-binding and skin-fixing capacity was very markedly reduced as compared to native rabbit immunoglobulin while at the same time its antibody activity remained substantially the same.

Attempts to use the same method for the cleavage of human immunoglobulin have heretofore failed. The highly acidic conditions that were used for cleaving the rabbit immunoglobulin brought about the precipitation of the human material, and thus were not suitable. We have found that native human immunoglobulin can be cleaved by CNBr in a mildly acidic medium without affecting its biologically and clinically beneficial properties.

Most of the antibody activity of human immunoglobulin is retained after cleavage with CNBr according to this invention. In contrast to the antibody activity, which is known to be located in the F$ab$ fragment, other biological properties which are related to the F$c$ fragment, such as genetic markers and other antigenic determinants, as well as complement binding and skin fixation sites, are essentially lost during the CNBr cleavage.

In accordance with the accepted denotation of F($ab'$)$_2$ for 5 S fragments obtained by pepsin digestion of immunoglobulin, we denote similar fragments, having two antibody sites, obtained by CNBr cleavage, as F($ab''$)$_2$.

In accordance with this invention, native human immunoglobulin is reacted in aqueous 0.005 to 0.05 M HCl solution with a molar excess of CNBr calculated on the total number of methionine groups in the molecule, at a temperature within the range of 0° to 30° C., the reaction is allowed to proceed until no more native immunoglobulin remains, and HCl and CNBr are then removed from the reaction mixture.

The absence of native immunoglobulin in the reaction mixture, and thereby the completion of the reaction may be established by electrophoresis.[3]

Cleavage of native immunoglobulin in this manner results in a degradation product, F($ab''$)$_2$, whose molecular weight is 100,000±5,000 as compared to the molecular weight 150,000 of the native material. The split-off portion, F$c$, is digested into a number of polypeptide fractions each of which is devoid of any biological activity. Consequently, for many applications it is not necessary to remove these fractions and the mixed product remaining after removing HCl and CNBr from the reaction mixture can be used.

The removal of HCl and CNBr can be effected by any well-known method as, for example, by adjusting the reaction mixture to pH 9 by a one-step addition of NaOH, dialysing the clear solution against an 0.1 M barbital buffer solution of pH 8.6 or a tris(hydroxymethyl)aminoethane buffer solution of pH 8 and then concentrating the remaining solution by vacuum dialysis.

Where it is desired to isolate the pure degradation product one may proceed by gel filtration on Sephadex G–100 (a dextran derivative, cross-linked with epichlorohydrin, supplied by Pharmacia Fine Chemicals, Uppsala, Sweden) performing the elution with 0.05 M HCl. HCl and the residual CNBr are removed from the effluent solution by lyophilization.

In accordance with the present invention a pure degradation product of native human immunoglobulin, F($ab''$)$_2$, has been isolated and characterized for the first time. This product is a white, water soluble powder characterized by the following:

(a) Molecular weight 100,000±5,000;

(b) Amino acid composition calculated from the analysis on the Beckman/Spinco automatic amino acid analyzer, model 120B, after hydrolysis under reduced pressure in constant boiling 6 N HCl for 22 hours at 110°, on the basis of molecular weight 100,000:

| Amino acid Residue— | No. of units |
|---|---|
| Lys | 55 |
| His | 16 |
| Arg | 27 |
| Asp | 72 |
| Thr (uncorrected for loss) | 79 |
| Ser (during hydrolysis) | 113 |
| Glu | 92 |
| Pro | 75 |
| Gly | 67 |
| Ala | 54 |
| Val | 82 |
| Met | 4 |
| ILeu | 21 |
| Leu | 73 |
| Tyr | 41 |
| Phe | 32 |

(c) Sedimentation constants determined with 0.7% aqueous and urea solutions in a Spinco Model E ultracentrifuge at 20–22° C. with the Schlieren optical system:

| | S[1] |
|---|---|
| At pH 2-peak at | 2.6 |
| At pH 5.8-peak at | 4.0 |
| In 8 M urea-peak at | 2.2 |

[1] S=Svedberg unit.

The above physical properties of the product resulting from the cleavage of human immunoglobulin are always the same, irrespective of the source of the native material. For example, the cleavage product prepared in accordance with this invention from native human immunoglobulin obtained from outdated human plasma, from native human immunoglobulin obtained from high titer serum of patients suffering from rheumatic fever, and from anti-A group native human immunoglobulin isolated from sera of individuals of the O blood group all have the same aforementioned physical properties. Thus, this invention is not limited to cleavage of native immunoglobulin obtained from any particular source.

In the following examples, the cleavage of native human immunoglobulin is shown in accordance with this invention, it being understood that the invention is not limited to these embodiments.

Starting materials for the following examples were prepared as indicated below:

(1) Normal human immunoglobulin was prepared from outdated human plasma by precipitation with ammonium sulfate (40%). The washed precipitate was dissolved in water and dialysed exhaustively against large volumes of 0.15 M NaCl followed by short dialysis against 0.0167 M phosphate buffer, pH 6.3 (during the dialysis fibrinogen precipitated). The clear solution was chromatographed in the same buffer on diethylaminoethyl cellulose (Biorad) according to Levy and Sober[4] and the fraction eluted was concentrated by vacuum dialysis.

(2) Human immunoglobulin with antibody activity was prepared in a similar way, starting from serum instead of plasma. Thus, immunoglobulin with antistreptolysin activity was isolated from high titer serum of patients suffering of rheumatic fever, and anti-A group immunoglobulin was isolated from sera of individuals of O blood group.

The immunoglobulin solutions of (1) and (2) above were stored in the frozen state. The protein concentration was determined spectrophotometrically, assuming a specific extinction coefficient of $$E_{1\,cm.}^{1\%} = 13.8 \text{ at } 280 \text{ m}\mu$$

---

[3] As, for example, the immunoelectrophoretic technique of Grabar et al. Analyse Immunoelectrophoretique, Masson et cie, Paris (1960), or any other method known in the art.

[4] Proc. Soc. Exp. Biol. and Med., 103 (1960), p. 250.

EXAMPLE I

A solution containing 400 mg. of normal human immunoglobulin prepared according to (1) above in 8 ml. of a 0.0176 M phosphate buffer solution, pH 6.3, was mixed with 8 ml. of a 0.15 M solution of CNBr in 0.1 M HCl. The mixture was allowed to stand in a tightly closed glass-stoppered container at room temperature for 4 hours. The reaction mixture was then worked up in two following ways:

(a) To 8 ml. of the above reaction mixture was added a 1 M solution of NaOH (0.42 ml), and the pH was thus adjusted to 8.0–8.5. The clear solution obtained was dialyzed against 0.5 M NaCl-0.02 M tris(hydroxymethyl) aminoethane buffer, pH 8.0–8.2. The product, though a perfectly clear solution, contained an appreciable amount of aggregates, as demonstrated by sedimentation in the ultracentrifuge, and contained undialyzable, split peptides as well. The total amount of protein recovered was 150–160 mg., and was concentrated by vacuum dialysis to a volume of 10–15 ml.

(b) An 8 ml. portion of the reaction mixture was applied to a Sephadex G-100 column measuring 2.5 x 150 cm., previously equilibrated with 0.05 M HCl. Elution was carried out at 4° C. with 0.05 HCl, and the absorbancy of the effluent was measured at 280 m$\mu$. (FIGURE 1). The main fraction recovered about 70% of the digestion mixture applied and containing 130–140 mg., was freeze-dried. The column fractionation removed the lower molecular weight peptides and most of the CNBr, and yielded almost a pure 5 S product. Lyophilization of the eluted product resulted in the removal of HCl and of the remainder of the CNBr. This lyophilized product was soluble in distilled water yielding a solution of pH 2, and remained soluble after dialysis against distilled water at pH 5.8 or against 0.03 M NaCl.

EXAMPLE II

The procedure of Example I was repeated, substituting human immunoglobulin with antibody activity prepared according to (2) above with similar results.

The cleavage product obtained in accordance with Example I was characterized both physically and chemically as follows:

Starch gel electrophoresis.[5]—The F($ab''$)$_2$ preparation obtained after the reaction of immunoglobulin with CNBr had a different electrophoretic pattern from that of native human immunoglobulin. The main fragment obtained had a higher mobility than that of the native protein and it was accompanied by a few fast migrating components. In contrast, immunoglobulin that was exposed to HCl in the absence of CNBr, did not show the presence of any components migrating faster than the immunoglobulin. These results indicate that by treatment with CNBr the molecule was cleaved in several places. Both the HCl control and the CNBr-treated immunoglobulin contained several slow components, which probably represent aggregates. The CNBr-produced fragment, after exposure to pH 9, showed more aggregated material than at pH 2.

Free boundary electrophoresis.[6]—In 0.1 M barbital buffer, pH 8.6, F($ab''$)$_2$ appeared as a homogeneous material with a mobility of $\mu = 1.25 \times 10^{-5}$ cm.$^2$/volt sec., as compared to $1.1 \times 10^{-5}$ cm.$^2$/volt sec. of the immunoglobulin.

Amino acid analysis.—The amino acid analysis of F($ab''$)$_2$ is given in Table I. The fragment still contained 4 methionine residues per molecular weight of 100,000, whereas in the original CNBr-cleavage product there were 6 methionine residues per molecular weight of 150,000. Thus, all the methionine residues which were not converted into homoserine or homoserine lactone, are preserved in the F($ab''$)$_2$.

TABLE I.—AMINO ACID COMPOSITION OF HUMAN IMMUNOGLOBULIN AND PRODUCTS OF CNBr DIGESTION [1]

| Amino acid residue: | Human immunoglobulin [2] | Immunoglobulin from pooled normal serum | CNBr digest | F($ab''$)$_2$ |
|---|---|---|---|---|
| Lys[3] | 82 | 79 | 80 | 55 |
| His | 27 | 23 | 24 | 16 |
| Arg | 39 | 40 | 40 | 27 |
| Asp | 102 | 102 | 105 | 72 |
| Thr [3] | 105 | 102 | 105 | 79 |
| Ser [3] | 157 | 144 | 144 | 113 |
| Glu | 130 | 128 | 129 | 92 |
| Pro | 98 | 98 | 97 | 75 |
| Gly | 89 | 89 | 89 | 67 |
| Ala | 70 | 71 | 74 | 54 |
| Val | 108 | 117 | 121 | 82 |
| Met | 11 | 11.8 | 5.8 | 4 |
| ILeu | 29 | 30 | 30 | 21 |
| Leu | 99 | 99 | 96 | 73 |
| Tyr | 54 | 55 | 51 | 41 |
| Phe | 42 | 46 | 48 | 32 |

[1] The results were calculated from the analysis after hydrolysis for 22 hrs, assuming the molecular weight of intact immunoglobulin to be 150,000, and that of F($ab''$)$_2$ to be 100,000. The values in the table denote number of residues per molecule.
[2] From Crumpton et al, "Amino Acid Composition of Human and Rabbit $\gamma$-globulins and of the Fragments Produced by Reduction" Biochem. J. 88, (1963), p. 228.
[3] The values were not corrected for loss during hydrolysis.

Ultracentrifugal analysis.—In aqueous solution at pH 2, F($ab''$)$_2$ sedimented as an almost homogeneous peak of 2.6 S, in comparison to the 5.5 S of native immunoglobulin. This acid pH caused a slight aggregation of the immunoglobulin. When tested in aqueous solution at pH 5.8, the native immunoglobulin had a sedimentation constant of 6.1 S, whereas F($ab''$)$_2$ showed a main peak (4.0 S) with a shoulder (6.1 S). In 8 M urea the respective sedimentation constant of the human immunoglobulin and its cleavage products were 3.0 S and 2.2 S. It seems, therefore, that under all experimental conditions tested the sedimentation rate of F($ab''$)$_2$ is lower than that of the original protein, although absolute values are dependent on the solvent.

The cleavage product obtained in accordance with Example I was submitted to the following biological tests:

Genetic factors.—Three genetic factors, Gm(1), Gm(4) and Gm(12) [7] were determined. The various Gm factors were determined in two samples of immunoglobulin, namely, normal immunoglobulin and antistreptolysin immunoglobulin. The determinations were carried out with the native protein, with the HCl-treated control and with the respective F($ab''$)$_2$. For each Gm factor determination one drop of the sample to be tested was mixed on a microscope slide with one drop of the respective anti-Gm serum and one drop of a 0.5% suspension of anti-R$h$ coated erythrocytes. After 5 to 10 minutes at room temperature, the agglutination was read microscopically. As shown in Table II, it was established in this manner that the cleavage product obtained in accordance with the invention was free of the Gm(12) factor, while retaining the Gm(1) and Gm(4) factors. The fact that the product according to the invention is devoid of the Gm(12) factor is of considerable importance since this is the most common factor among the Caucasian race.

---

[5] Starch gel electrophoresis in 8 M urea formate buffer was performed by the method described by Edelman et al. in J. Exp. Med., 113 (1961), p. 861.
[6] Free boundary electrophoresis was carried out in a Tiselius apparatus using a 2 ml. cell and 0.1 M barbital buffer at pH 8.6 as described by Longsworth in Anal. Chem., 25 (1953), p. 1074.
[7] Nomenclature according to Notation for genetic factors of human immunoglobulins, Bull. World Health Organ., 33 (1965), No. 5.

TABLE II.—THE EFFECT OF CNBR TREATMENT ON THE GENETIC MARKERS OF THE GM TYPE

| Gm factors | Pooled human immunoglobulin | | | Immunoglobulin with anti-streptolysin activity | | |
|---|---|---|---|---|---|---|
| | Native | HCl-control | F(ab")$_2$ | Native | HCl-control | F(ab")$_2$ |
| Gm(1) | + | + | + | + | + | + |
| Gm(12) | + | + | − | + | + | − |
| Gm(4) | + | + | + | + | + | + |

Interaction with human antiglobulin factors.—The reaction of native immunoglobulin with anti-γ-globulin factors, present in sera from patients with rheumatoid arthritis, was established by using inhibition of agglutination of latex coated with native human immunoglobulin, with the cleavage product thereof, and with a control. It was shown that whereas the native material inhibited the agglutination at a titer of 1/80, no inhibitory effect was caused by the cleavage product (F(ab")$_2$), as shown in Table III.

intracardially as the antibody source. The results are given in Table IV:

TABLE IV.—DIAMETER OF LESION (mm.)

| (μg.) Amount of protein injected intradermally | Challenge with native immunoglobulin | | Challenge with F(ab")$_2$ | |
|---|---|---|---|---|
| | Anti-heavy chain | Anti-light chain | Anti-heavy chain | Anti-light chain |
| 50 | 15 | 16 | 11 | 0 |
| 10 | 15 | 11 | 8 | 0 |
| 5 | 14 | 10 | 0 | 0 |
| 2.5 | 12 | (1) | 0 | (1) |
| 1 | 12 | (2) | 0 | 0 |
| 0.33 | 8 | (1) | 0 | (1) |
| 0.11 | (2) | 0 | 0 | 0 |
| 0.11 | (2) | 0 | 0 | 0 |
| 0.036 | 0 | (1) | 0 | (1) |

[1] Not done.
[2] Trace.

TABLE III.—INHIBITORY CAPACITY OF NATIVE IMMUNOGLOBULIN AS COMPARED TO TREATED IMMUNOGLOBULIN INTERACTION OF IMMUNOGLOBULIN-COATED LATEX WITH ANTIGLOBULIN FACTORS—DILUTION [1]

| Inhibition by | 1/10 | 1/20 | 1/40 | 1/80 | 1/160 | 1/320 | 1/640 | 1/1,080 |
|---|---|---|---|---|---|---|---|---|
| None | + | + | + | + | + | + | + | ± |
| Native immunoglobulin | + | + | + | ± | − | − | − | − |
| Control-HCl treated immunoglobulin | − | − | − | − | − | − | − | − |
| F(ab")$_2$ | + | + | + | + | + | + | ± | − |

[1] Dilutions of the rheumatoid arthritis serum alone and after mixing with different protein preparations.

Complement-binding capacity.—In this procedure we used lyophilized guinea pig complement and antisheep hemolysin (Difco). Various amounts (2–4 mg.) of immunoglobulin, both native and CNBr-treated, were mixed in the cold with a constant amount (22 C′×H$_{50}$ units) of complement. Following incubation for 30 min. at 37° C. and storage at the cold room overnight, the solutions were diluted to yield a concentration suitable for the estimation of the residual activity of complement.

Native human immunoglobulin is capable of nonspecific binding of guinea pig complement while the cleavage product according to this invention binds substantially no complement. This was demonstrated by the fact that, while native human immunoglobulin inhibited hemolysis of sheep red blood cells by antisheep hemolysin in the presence of complement, the passive binding of complement was decreased on treatment with acid, and the inhibition by the cleavage product was negligible. Thus, as seen in FIGURE 2, 4 mg. of the native immunoglobulin caused almost complete inhibition of hemolysis, due to extensive binding of the complement, while the binding by F(ab")$_2$ was almost negligible.

Reverse passive cutaneous anaphylaxis.—In order to study the skin-binding capacity of the cleavage product as compared to that of native human immunoglobulin, the reverse passive cutaneous anaphylaxis method was employed.[8] The native human immunoglobulin and its cleavage product were injected, respectively, intradermally as the antigen, while goat antiserum was injected The reaction with the antilight chain is a direct indication of the skin binding capacity, since the treated protein retains its full capacity to react with antilight chain serum. The results show that while the native immunoglobulin gives a positive reaction with the antisera when injected at a level of 0.33 μg. or less, the cleavage product according to the invention reacts with the anti-heavy chain serum only at a level of 5 μg. and does not react at all with the antilight chain serum.

Antistreptolysin activity.—Sera of patients suffering from rheumatic fever are known for their capacity to react with streptolysin O [9]. Since streptolysin O causes hemolysis of human red blood cells, its interaction with the specific antistreptolysin in such sera is manifested by the inhibition of hemolysis. Solutions of 1 ml. containing various amounts (0.1–50 μg.) of immunoglobulin, both native and subjected to various treatments, were mixed with 0.5 ml. of Bacto Streptolysin O Reagent (Difco). Following 15 min. at 37° C., 0.5 ml. of 5% rabbit erythrocytes suspension was added and the mixtures were incubated at 37° C. for 45 min. The extent of hemolysis was determined from the absorbancy of the supernatant fluids at 541 mμ. It was determined that the antistreptolysin activity of the cleavage product according to the invention was substantially the same as that of native human immunoglobulin.

Isohemagglutinin activity.—Native human immunoglobulin isoagglutinin prepared from a normal type O individual and its cleavage product were tested for hemag-

[8] Ovary, reverse passive cutaneous anaphylaxis in the guinea pig with horse, sheep or hen antibodies, Immunology, 3 (1960), p. 19.

[9] Vorlander et al., Immunologische Untersuchungen bei entzundlichenrheumatischen Erkrankungen, Immunopathologie in Klinik und Forschung, Thieme Verlag (1961), p. 436.

glutinating activity using erythrocytes of type A. The results are given in Table V:

TABLE V.—CONCENTRATION IN MG./ML.

| Sample | 0.24 | 0.15 | 0.1 | 0.06 | 0.04 | 0.03 | 0.015 |
|---|---|---|---|---|---|---|---|
| Native immunoglobulin | +++ | +++ | +++ | ++ | ± | ± | − |
| F(ab″)$_2$ | +++ | +++ | +++ | ++ | − | − | − |

It can be seen from the above table that the threshold concentration of native human immunoglobulin was 0.03 mg./ml., and its cleavage product gave a negative reaction at a concentration of 0.04 mg./ml. Both gave a strongly positive reaction at 0.06 mg./ml. indicating that the capacity to agglutinate the appropriate red blood cells was not impaired by the cleavage.

It follows from the above tests that the novel product according to the invention obtained by cleavage of native human immunoglobulin with CNBr under the conditions specified, retains the antibody activity of the native material while being devoid of most of its hetero- and isoantigenic determinants, as well as its capacity to bind complement and fix to skin and is accordingly suitable for intravenous injection. The advantage of using CNBr for cleavage of immunoglobulin is in its defined specificity and in the ease of removal of the reagent.

It will now be seen that there is herein provided an improved process for producing a cleavage product of immunoglobulin which satisfies all of the objectives of the instant invention, and others, including many advantages of great practical utility and importance in clinical and preventive medicine.

Since many embodiments may be made of the instant inventive concept, and since many modifications may be made of the embodiments herein before shown and described, it is to be understood that all matter herein is to be interpreted merely as illustrative and not in a limiting sense.

We claim:
1. A process for preparing a cleavage product of immunoglobulin comprising reacting native human immunoglobulin in an aqueous solution of HCl of from about 0.005 to about 0.05 molar, with CNBr in molar excess based on the total number of methionine groups in the molecule, for a period of time sufficient to react substantially all said immunoglobulin.
2. The process of claim 1 wherein the reaction mixture is submitted to gel filtration, and the main fraction of the eluted material is freeze-dried, whereby the substantially pure cleavage product is obtained.
3. The process of claim 1 further comprising reacting said immunoglobulin with said CNBr at a temperature of from about 0 to about 30° C.
4. The process of claim 3 further comprising reacting said immunoglobulin with said CNBr at room temperature for about 4 hours.
5. The process of claim 3 further comprising removing the HCl and CNBr from the solution after the reaction of said immunoglobulin.
6. The process of claim 5 wherein said HCl and said CNBr are removed from the solution by adjusting said solution to about pH 9 and dialyzing said solution.
7. The product of the process of claim 2.
8. A composition suitable for intravenous injection comprising a solution of the product of the process of claim 2.
9. The product of the process of claim 1.

References Cited

Journal of Biological Chemistry, 241 (1966), pp. 3247–55, Cahnmann et al.

Journal of Molecular Biology, 20 (1966), pp. 537–43, S-Jöquist.

WILLIAM H. SHORT, Primary Examiner

HOWARD SCHAIN, Assistant Examiner

U.S. Cl. X.R.

260—112; 424—85, 101